(12) United States Patent
Stjernholm et al.

(10) Patent No.: US 9,119,213 B2
(45) Date of Patent: Aug. 25, 2015

(54) METHODS AND APPARATUSES FOR FACILITATING REDUCTION OF INTERFERENCE IN A WIRELESS TELECOMMUNICATIONS SYSTEM

(75) Inventors: Paul Stjernholm, Lidingö (SE); Tomas Nylander, Värmdö (SE); Oscar Zee, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 385 days.

(21) Appl. No.: 13/389,551

(22) PCT Filed: Sep. 9, 2009

(86) PCT No.: PCT/SE2009/051006
§ 371 (c)(1),
(2), (4) Date: Feb. 8, 2012

(87) PCT Pub. No.: WO2011/031195
PCT Pub. Date: Mar. 17, 2011

(65) Prior Publication Data
US 2012/0157110 A1  Jun. 21, 2012

(51) Int. Cl.
*H04W 72/00* (2009.01)
*H04W 72/08* (2009.01)
*H04W 16/16* (2009.01)
*H04W 28/04* (2009.01)
*H04W 72/12* (2009.01)

(52) U.S. Cl.
CPC ............ *H04W 72/082* (2013.01); *H04W 16/16* (2013.01); *H04W 28/04* (2013.01); *H04W 72/1205* (2013.01)

(58) Field of Classification Search
CPC ... H04W 72/00; H04W 72/005; H04W 72/04; H04W 72/082; H04W 52/244
USPC .......................................... 455/450; 370/338
See application file for complete search history.

(56) References Cited

U.S. PATENT DOCUMENTS

| | | | |
|---|---|---|---|
| 6,259,922 B1 * | 7/2001 | Benveniste | ................ 455/452.1 |
| 2009/0124261 A1 * | 5/2009 | Shimomura | .................. 455/436 |
| 2009/0221295 A1 | 9/2009 | Sahin et al. | |

OTHER PUBLICATIONS

3rd Generation Partnership Project. "Technical Specification Group Radio Access Networks; LTE FDD Home eNodeB RF Requirements Work Item Technical Report (Release 9)." 3GPP TR 36.9xx V0.2.0, Mar. 2009.
3rd Generation Partnership Project. "Need for an X2 Interface for Home eNB." 3GPP TSG-RAN WG3 #57bis, R3-071816, Oct. 8-11, 2007, Sophia-Antipolis, France.

(Continued)

*Primary Examiner* — Marcos Batista
(74) *Attorney, Agent, or Firm* — Coats & Bennett, P.L.C.C.

(57) ABSTRACT

The exemplary embodiments of the present invention relate to methods and apparatuses (800, 900) for facilitating reduction of interference in a network. According to exemplary embodiments, an apparatus acting as a first radio base station (macro or femto) (800, 900) is configured to acquire information including a scheduling scheme indicating information on how radio resources are allocated in second radio base station (femto or macro). The information is then used by a scheduler to allocate radio resources which are disjoint the radio resources already allocated by the scheduler of second radio base station.

19 Claims, 9 Drawing Sheets

(56) References Cited

OTHER PUBLICATIONS

3rd Generation Partnership Project. "Downlink Interference Coordination Between eNodeB and Home eNodeB." 3GPP TSG-RAN Working Group 4 (Radio) meeting #52, R4-093244, Aug. 24-28, 2009, Shenzhen, China.

3rd Generation Partnership Project. "Femtocell and Macrocell Interference Coordination Based on SFR." 3GPP TSG-RAN WG4 #52, R4-093349, Aug. 24-28, 2009, Shenzhen, China.

Sarperi, L. et al. "Avoiding Data Channel Femto-Macro Interference." Project IEEE 802.16 Broadband Wireless Access Working Group, IEEE C802.16m/08/1366r1, XP007908600, Nov. 12, 2008, pp. 1-3.

* cited by examiner

```
┌─────────────────────────────────────────────────┐
│  Determining in the second radio base station a scheduling
701  scheme including information on how radio resources are
│                        allocated;
└─────────────────────────────────────────────────┘
                          │
                          ▼
┌─────────────────────────────────────────────────┐
│  Transmitting information included in the scheduling scheme to
│  a first radio base station such that to allow the first radio base
702  station to determine a scheduling pattern on how to allocate
│  resources which are disjoint the resources already allocated by
│                the second radio base station.
└─────────────────────────────────────────────────┘
```

FIGURE 7

METHODS AND APPARATUSES FOR FACILITATING REDUCTION OF INTERFERENCE IN A WIRELESS TELECOMMUNICATIONS SYSTEM

TECHNICAL FIELD

The present invention relates generally to the field of wireless communications, and, more specifically, to methods and radio base stations for facilitating reduction of interference between the radio base stations in a wireless system.

BACKGROUND

Wireless access networks have become a key element of a variety of telecommunications network environments. As to enterprise network environments, they provide convenient wireless access to network resources for employers or customers carrying laptops and/or mobile handheld devices. In addition, wireless access points operable with diverse communication devices, such as laptops, mobile phones, etc., are broadly used in public environment such as e.g., hotels, train stations, airports, restaurants, schools, universities and homes, and are mostly used to offer high-speed internet access.

The telecommunication industries and operators are currently specifying and investigating the possibility to further increase the coverage area offered by cellular communications network systems to home or small areas. Examples of cellular communication network systems are: the Universal Mobile Telecommunication Systems (UMTS) network, also known as third generation (3G) cellular network system or wideband code division multiplexing access (WCDMA) and the Long Term Evolution (LTE) which is the next generation mobile communication system of the UMTS system. It is the $3^{rd}$ Generation Partnership Project (3GPP) that is responsible for the standardization of UMTS and LTE.

According to such investigation, a limited number of users with user equipments (UE) may be provided with e.g. 3G coverage and/or LTE coverage using a small radio base station or a femto radio base station. In the 3G system, a femto radio base station is commonly called a femto NodeB or a home 3G access point (H3GAP) or a Home NodeB (HNB). In LTE, a femto radio base station is commonly called a Home eNodeB (HeNB) or a femto eNodeB. The coverage area of a HeNB or of a HNB is called a femto cell to indicate that the coverage area is relatively small compared with a coverage area of a macro radio base station. The coverage area of a macro radio base station is called a macro cell. In the 3G system, a macro radio base station is called a NodeB whereas in LTE, the macro radio base station is called an evolved NodeB or eNB.

A femto base station is configured to provide normal LTE/3G coverage for the end users in the femto cell and is further configured to be connected to a mobile operator's network using some kind of an Internet Protocol (IP) based transmission. One alternative for the IP based transmission is to use fixed broadband access (like xDSL, Cable, etc.) or broadband mobile IP based transmission to connect the femto base station to the network. The end user provided with a UE in a home environment or a in an enterprise can thus connect the femto base station to an existing broadband network in order to achieve connectivity to the mobile core network. Furthermore, these femto base stations can be activated in different locations without involvement of the operator i.e. without any operator control as end users move around.

In the LTE system, a femto base station may use the same frequency spectrum (or part of the same frequency spectrum) as the macro base station (eNB or eNodeB). This is also the case for the 3G system. If a femto base station is allocated a dedicated spectrum, the interference between the femto and macro base stations are avoided. However, it is very likely that femto base stations will share the same spectrum (or part of the same spectrum) as that of the macro base station. This implicates that the probability of interference increases. The interference is further emphasized by access restrictions to the femto cells, where only a limited number of users are allowed access. Thus if the femto and macro radio base stations share the same spectrum and they can freely allocate resources within the shared spectrum, the uplink and downlink interference may radically increases.

One way to reduce the interference when femto and macro radio base stations share the same frequency spectrum could be to allocate a part of the spectrum so that a part is primarily used by the femto physical layer and then make sure that the macro base station avoids, as far as possible, scheduling users in the part of the spectrum allocated to the femto layer. This is illustrated in FIG. 1 where it is shown a simplified exemplary shared spectrum allocation for the downlink. As depicted, part of the spectrum, 715 MHz-720 MHz is shown dedicated to the femto physical layer of the femto radio base station and the remaining spectrum. The other part of the spectrum 700 MHz-715 MHz can, in first hand, be used by the macro physical layer to schedule user data. By doing so, downlink interference can be limited. It should be noted a similar spectrum allocation is also possible for the uplink case, although not shown in FIG. 1.

A drawback with such a solution is that the Operation and Maintenance (O&M) of the macro and femto layers is handled by separate entities meaning that a static/manual configuration using O&M in the respective domain (femto domain resp. macro domain) is required which causes extra work and is error prone.

Another way to reduce the interference is to use a scheduling method known as Frequency Selective Scheduling (FSS). FSS relies on Channel Quality Indication (CQI) measurements reported by UEs to avoid scheduling radio resources or resource blocks where the UE is experiencing interference. For example, a UE located in the coverage area of a macro cell and which is not close to any of the coverage areas of the femto cells, will not experience downlink interference from femto base stations. However, when the macro base station schedules to this UE on resource blocks or radio resources used by the femto base station (or femto layer), interference is generated towards the UEs that are served by the femto base station thereby resulting in reduced downlink performance for the UEs in the femto cell.

Yet another way to reduce interference is to use a function known as a Inter-Cell Interference Coordination (ICIC) function. According to the ICIC function, information about allocated radio resources is transmitted using an interface called the X2 interface. However, the X2 interface is not present/defined for femto base stations. This means that ICIC cannot be used to mitigate interference between macro and femto base stations.

SUMMARY

An object of the exemplary embodiments of the present invention is thus to address the above mentioned problem by providing methods and apparatuses corresponding to a macro radio base station and a femto radio base station, that facilitate reduction of interference between the macro and femto radio base stations.

According to a first aspect of exemplary embodiments of the present invention, the above stated problem is solved by means of a method for use in a first radio base station, for facilitating reduction of interference between the first radio base station and a second radio base station. The method comprises: acquiring at the first radio base station, information including a scheduling scheme (or scheduling strategy) indicating information on how radio resources or resource blocks are allocated in the second radio base station; determining, in the first radio base station, a scheduling pattern based on the acquired information, said pattern determining comprising allocating radio resources or resource blocks which are disjoint the radio resources already allocated by the second radio base station such that to facilitate reduction of the interference between the first and second radio base stations. It should be noted that in the acquiring step, the information including the scheduling scheme indicating information on how radio resources or resource blocks are allocated in the second radio base station can, either explicitly or implicitly, indicate information on how to schedule resources in the first radio base station. The first radio base station can be a femto radio base station whereas the second radio base station can be a macro radio base station. Alternatively, the first radio base station can be a macro radio base station and the second radio base station can be a femto radio base station.

According to a second aspect of exemplary embodiments of the present invention, the above stated problem is solved by means of a method for facilitating reduction of interference between a first radio base station and a second radio base station. The method comprises: determining in the second radio base station a scheduling scheme including information on how radio resources are allocated in the second radio base station; transmitting said information to the first radio base station to allow the first radio base station to determine, based on the transmitted information, a scheduling pattern on how to allocate radio resources or resource blocks which are disjoint the resources already allocated by the second radio base station such that to facilitate reduction of interference between the first and second radio base stations. Also here, the sent information including the scheduling scheme indicating information on how radio resources or resource blocks are allocated in the second radio base station can, either explicitly or implicitly indicate information on how to schedule resources in the first radio base station. The first radio base station can be a femto radio base station whereas the second radio base station can be a macro radio base station. Alternatively, the first radio base station can be a macro radio base station and the second radio base station can be a femto radio base station.

According to a further aspect of exemplary embodiments of the present invention, there is provided a radio base station for facilitating reduction of interference between the radio base station and another radio base station. The radio base station comprising a receiver configured to acquire information including a scheduling scheme indicating information on how radio resources are allocated in the other radio base station. The radio base station further comprising a scheduler configured to determine a scheduling pattern based on the acquired information, said scheduler is configured to allocate radio resources which are disjoint the radio resources already allocated by the other radio base station such that to facilitate reduction of interference between the radio base station and the other radio base station. The information including the scheduling scheme indicating information on how radio resources or resource blocks are allocated in the other radio base station can, either explicitly or implicitly indicate information on how to schedule resources in the radio base station. The radio base station can be a femto radio base station whereas the other radio base station can be a macro radio base station. Alternatively, the radio base station can be a macro radio base station and the other radio base station can be a femto radio base station.

An advantage of the exemplary embodiments of the present invention is to avoid, for the purpose of facilitating reduction of interference, manual or static configuration of the schedulers of the femto and the radio base stations respectively via manual or static configuration of the operator's managements (O&M) entities.

Still other advantages, objects and features of the exemplary embodiments of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

BRIEF DESCRIPTION OF THE DRAWINGS

FIG. 7 is a diagram illustrating a flowchart of a method for use in a radio base station, according to exemplary embodiments of the present invention.

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention and its embodiments may be practiced in other embodiments that depart from these specific details.

The exemplary embodiments of the present invention are described herein by way of reference to particular example scenarios. In particular the invention is described in a non-limiting general context in relation to a network wherein LTE macro radio base stations i.e. eNBs and femto radio base stations are employed. It should be noted that the present invention and its exemplary embodiments may also be applied to other types of radio technologies and architectures employing macro radio base stations and femto radio base stations such as WCDMA or 3G.

Figure 1:
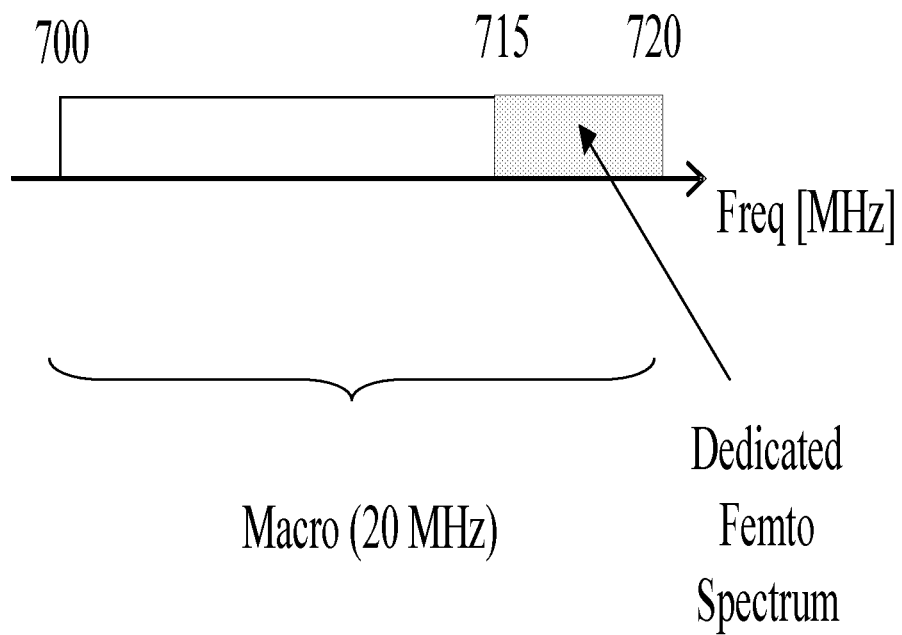
FIG. 1 illustrates an example of a shared spectrum allocation in LTE.
Figure 2:
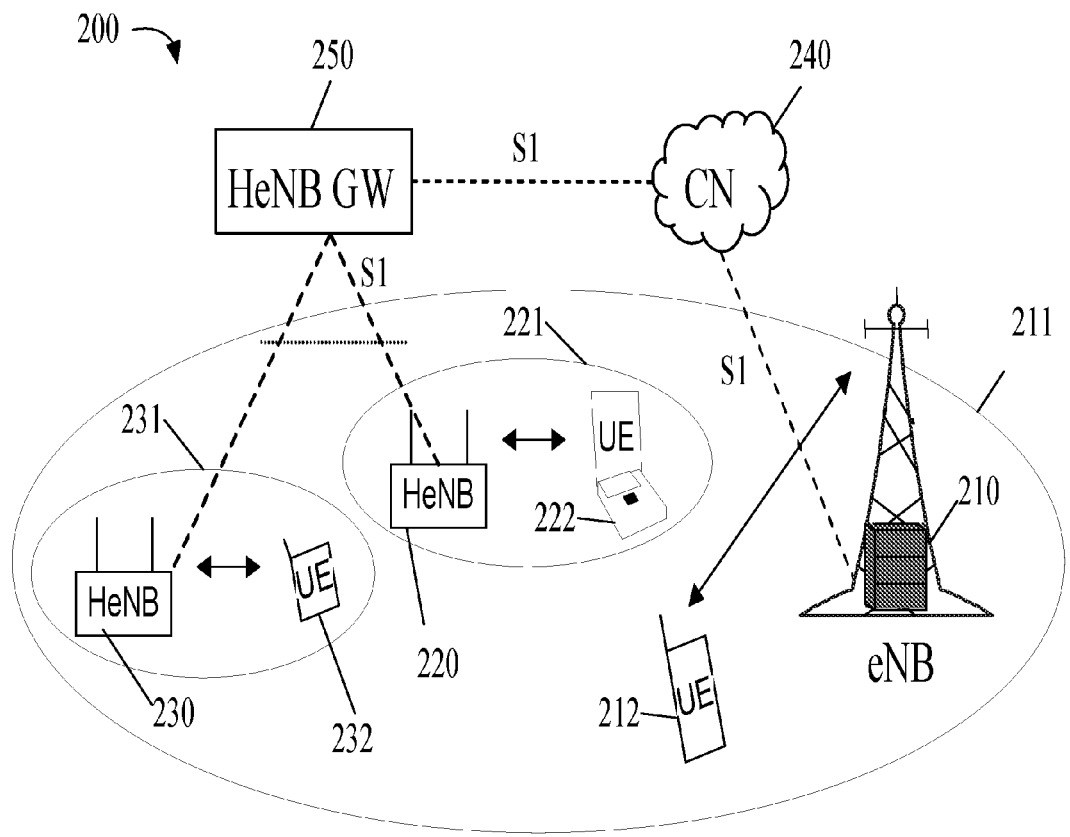
FIG. 2 is a simplified block diagram illustrating an exemplary wireless telecommunications network wherein the exemplary embodiments of the present invention may be used.

Referring to FIG. 2 there is illustrated a LTE network 200 wherein exemplary embodiments of the present invention can be applied. As shown, the network comprises a macro a radio base station denoted eNB 210 having a coverage area 211, and two femto radio base stations denoted HeNB 220 and HeNB 230. HeNB 220 has coverage area 221 and HeNB 230 has coverage area 231. The coverage area of a HeNB corresponds to a femto cell whereas a coverage area of a eNB corresponds to a macro cell. Also shown in FIG. 2 are user equipments UEs denoted UE 212, UE 222 and UE 232. UE 212 is shown located outside the coverage areas of HeNBs 220 and 230 and this UE 212 is considered to be served by eNB 210. UE 221 is shown located within the coverage area 221 of HeNB 220 and is considered to be served by HeNB 220. UE 231 is shown located within the coverage area 231 of HeNB 230 and is considered served by HeNB 231. A UE can be a mobile phone (or "cellular phone"), a laptop with mobile termination and thus can be e.g. portable, pocket, handheld, computer-included, or car-mounted mobile device which can communicate voice and/or data with a radio access network. As an example, UE 222 may communicate with the radio access network via a HeNB 220 through an IP based transmission network (not shown) which, as described earlier, can be either broadband fixed IP based transmission (e.g. xDSL) or broadband mobile IP based transmission. A Core Network (CN) 240 is also shown connected to eNB 210 via e.g. a standard S1 interface. CN 240 may also be connected to HeNBs 220 and 230 using the standard S1 interface comprising of both control plane (S1-MME) and user plane (S1-U). FIG. 2 also shows a eNodeB GateWay (HeNB GW) 250 linking CN 240 to the HeNBs 220 and 230 by means of the S1 interface. HeNB GW 250 can be viewed as a concentrator node. Such a node may be needed if a large amount of S1 interfaces are present. This is the case for example if a high number (hundreds, thousands or even millions) of HeNBs are deployed. It should be noted that HeNB GW 250 is not necessary if only a few HeNBs are deployed. It should also be noted that any number of HeNBs, UEs or eNBs can be used. Furthermore, the exemplary embodiments of the present invention do not require the presence of HeNB GW 250.

It should be mentioned that transport network security is generally used to protect the signalling and the CN 240, which is not shown in FIG. 2.

As previously described, the ICIC function can be used to reduce interference between macro cells served by eNBs, for which information about used resources is sent between eNBs using the standardized X2 interface. However, the X2 interface is not currently defined/used between eNBs and HeNBs. This means that the ICIC function cannot be used to reduce interference between eNBs and HeNBs or between macro cells and femto cells.

In the following, it is assumed the case where eNB 210 and HeNBs 220 and 230 share the same frequency spectrum (or part of the same frequency spectrum). This means that the interference in the downlink and/or the uplink is unavoidable if no measures are taken to reduce such interference.

In order to facilitate reduction of the interference between macro and femto cells, and according to exemplary embodiments of the present invention, information about the scheduling strategy/scheme used is shared between eNB 210 and HeNBs 220 and 230 or similarly between the femto and macro layers, so that the eNB 210 and the HeNBs 220, 230 can adopt/adjust their scheduling of the radio resources or of their resource blocks. By information about the scheduling strategy/scheme is meant information including a scheduling strategy/scheme indicating information on how radio resources (or resource blocks) are allocated in the radio base stations (macro and/or femto).

As an example, eNB 210 acquires from HeNB 220 information including a scheduling scheme indicating how resources are allocated in HeNB 220 for UEs served by HeNB 220, and then eNB 210 determines based on the acquired information, a scheduling pattern. The determination comprises allocating radio resources (or resource blocks) which are disjoint the radio resources already indicated as allocated in the acquired scheduling scheme of HeNB 20. This will facilitate reduction of interference between eNB 210 and HeNB 220. It should be noted that the information including the scheduling strategy/scheme indicating information on how radio resources or resource blocks are allocated in HeNB 220 can, either explicitly or implicitly, indicate information on how to schedule radio resources in the eNB 210. In other words, the HeNB 220 can inform the eNB 210, explicitly or implicitly, how to schedule resources in the eNB 210 via the information including the scheduling strategy/scheme on how radio resources are allocated in the HeNB 220.

According to an exemplary embodiment of the present invention, the information including the scheduling scheme of HeNB 220 can be acquired by eNB 210 during a handover signalling involved when a UE is handed over from one domain (femto or macro) to the other domain (macro or femto). The handover signalling comprising the scheduling scheme can be conveyed over the predefined S1 interface. Note that since the X2 interface currently is not present for HeNBs, the S1 interface is, according to an exemplary embodiment of the present invention, used to carry the scheduling scheme. As an example, the HeNB 220 can indicate in it scheduling scheme that allocation of radio resources (or resource blocks) for user data starts from lower frequency in the frequency domain and that allocation of resources for user data starts from lower subframes in the time domain. The scheduler of eNB 210 makes use of this information to allocate resources which are disjoint the resources already allocated by HeNB 220. As an example, eNB 210 or it scheduler can determine to allocate radio resources (or resource blocks) for user data starting from higher frequency in the frequency domain and higher subframes in the time domain. An advantage with this is that static configuration of what part of the spectrum is used by the eNB or by the HeNB is not necessary.

Note that the above described is equally applicable for the HeNB 220 meaning that the HeNB 220 can receive/acquire information including a scheduling scheme applied by eNB 210 and indicating how resources are allocated in the eNB 210 and then the scheduler of HeNB 220 can determine a scheduling pattern, based on the acquired information, and HeNB 220 can allocate resources which are disjoint the resources indicated as allocated in the scheduling scheme of eNB 210. Also here, the information including the scheduling strategy/scheme indicating information on how radio resources or resource blocks are allocated in eNB 210 can, either explicitly or implicitly, indicate information on how to schedule radio resources in HeNB 220. In other words, eNB 210 can inform the HeNB 220, explicitly or implicitly, how to schedule resources in the HeNB 220 via the information including the scheduling strategy/scheme on how radio resources are allocated in the eNB 220. The HeNB 220 can thereafter determine I own scheduling strategy. Also in here, the information acquired by the HeNB 220 can be received in a handover signalling. An advantage of sending a scheduling scheme/strategy in a handover signalling is that, if a scheduling strategy is changed after the HeNB is started, the HeNB can dynamically acquire the information regarding the scheduling strategy of a eNB involved in the handover scenario.

According to another exemplary embodiment of the present invention, the information including the scheduling scheme can be conveyed in a system information that is e.g. regularly broadcasted in System Information Block (SIBs). A listening device of the eNB 210 or of the HeNB 220 can hear this information and then use it in its scheduling strategy as described above. An advantage with broadcasting system information comprising the scheduling scheme is that a plurality of HeNBs and/or eNBs can listen to this information and then use that information to adapt their own scheduling strategy. A further advantage is that it is simple to implement in the system.

According to another exemplary embodiment of the present invention, the HeNB 220 can measure the interference caused by the macro layer of eNB 210, continuously over time and frequency domain and after a certain period the HeNB 220 is able to recognize the scheduling pattern on the macro layer (since the load on the macro layer varies over timer), and thereby adapt its own scheduling strategy (and the transmission frequency) accordingly. Thus in this exemplary embodiment, the HeNB 220, provided with a listening device/unit, acquires information on the scheduling scheme of eNB 210 from measurements performed by the HeNB 220. Again, this is also applicable for the eNB 210 which is also provided with a listening device/unit. In this case, eNB 210 is configured to measure the interference caused by the femto layer of HeNB 220 and further configured to determine, after a certain time, the scheduling scheme of HeNB 220 (since the load of the femto layer varies over time) and use that information to adapt its own scheduling strategy.

Figure 3:
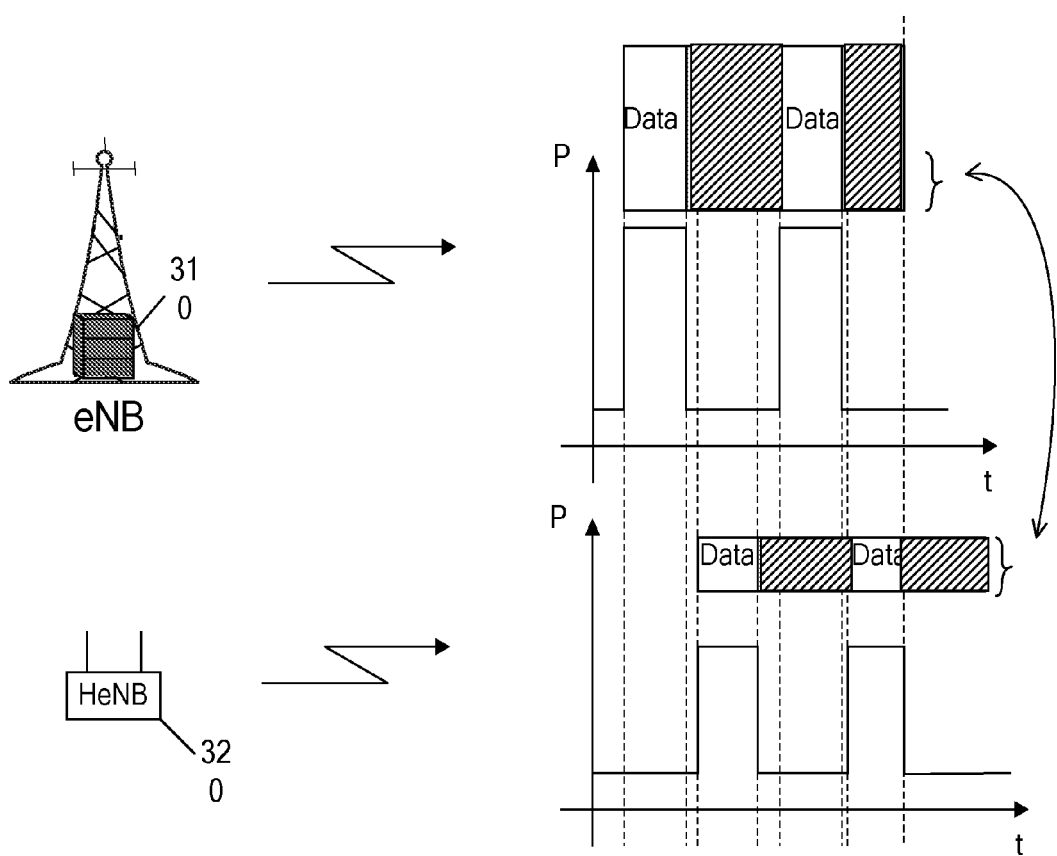
FIG. 3 is an example of data transmission over time to minimize interference according to an exemplary embodiment of the present invention.

Referring to FIG. 3 there is illustrated an example of data transmission over time when the above described exemplary embodiments are applied. Once the scheduling patterns/strategies are determined based on the mutually shared information on how resources are allocated, the interference can be mitigated by e.g. letting eNB 310 primarily transmit user data in certain subframes and the femto layer of HeNB 320 primarily transmit data in other disjoint subframes. The example of FIG. 3 shows that HeNB 320 schedules and transmits data in subframes that are in opposite order than those used by eNB 310. P in FIG. 3 denotes the Radio Frequency (RF) power lever over time (t). In FIG. 3, the eNB 310 is assumed transmitting user data on a Physical Downlink Shared Channel (PDSCH) in certain subframes and the HeNB 320 in separate subframes. However, some information may need to be transmitted in subframes not used e.g. reference signals (grey in the figure). Such scheme would mitigate interference up to he point where the macro layer, for capacity reasons (i.e. too high load), needs to use the same subframes as those of the femto layer. The double arrow shown in FIG. 3 indicates the relative location of the HeNB 320 spectrum within the eNB 310 spectrum.

Figure 4:
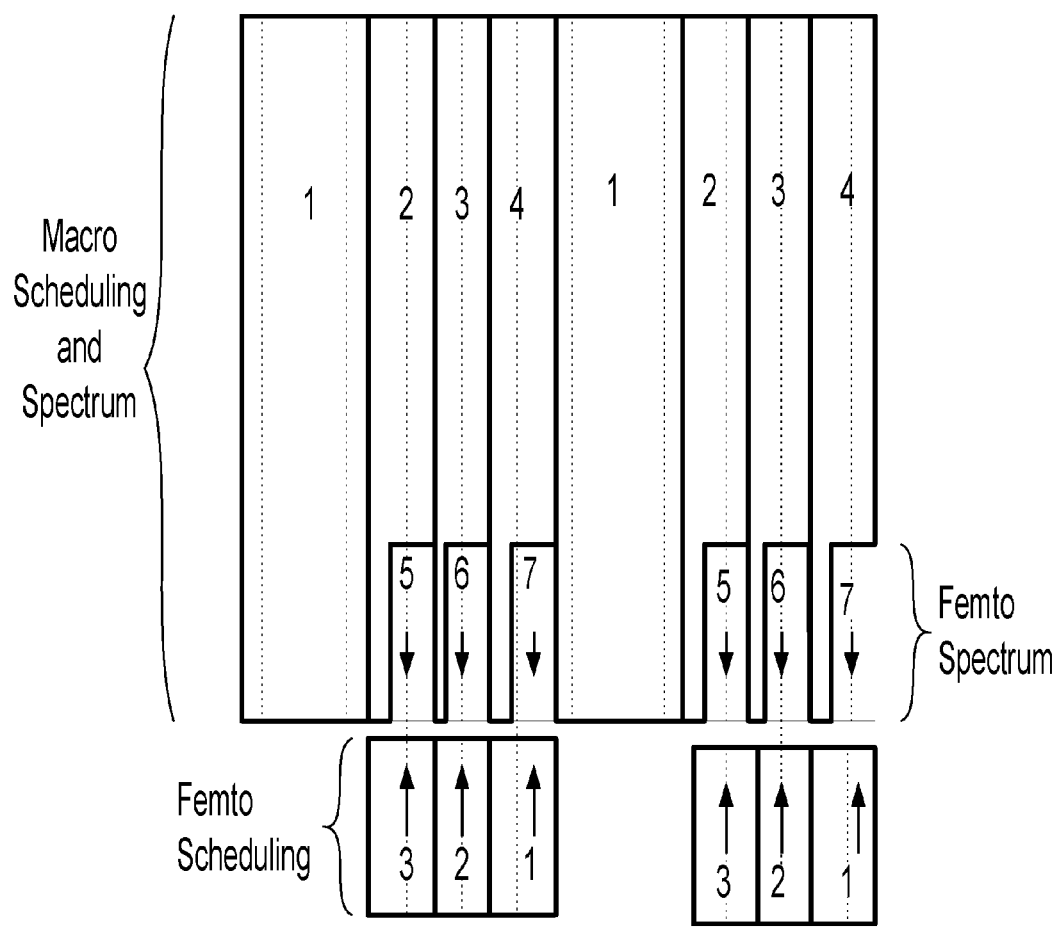
FIG. 4 is an example of a scheduling strategy according to an exemplary embodiment of the present invention.

Referring to FIG. 4 there is illustrated of a scheduling strategy according to an exemplary embodiment of the present invention. As shown, the femto and macro layers share the same spectrum. The numbers in the figure indicate the order in which resources (radio resources or resource blocks) are allocated by the scheduler of the eNB and by the scheduler of the HeNB respectively. As an example a number can indicate in which order the available resources the scheduler shall allocate depending on the load of the system. As an example if the average throughput of the macro cell, served by the eNB, is 50% of the total macro cell capacity. The scheduler of the eNB shall allocate resources numbered 1, 2. In the same time, if the femto cell, served by the HeNB, has an average throughput of 60% of the maximum throughput. The scheduler of HeNB shall allocate 1, 2 and 3 in order to minimize the interference. The arrows indicate the order of allocating resources (radio or blocks) within the overlapping part of the spectrum.

Figure 5A:
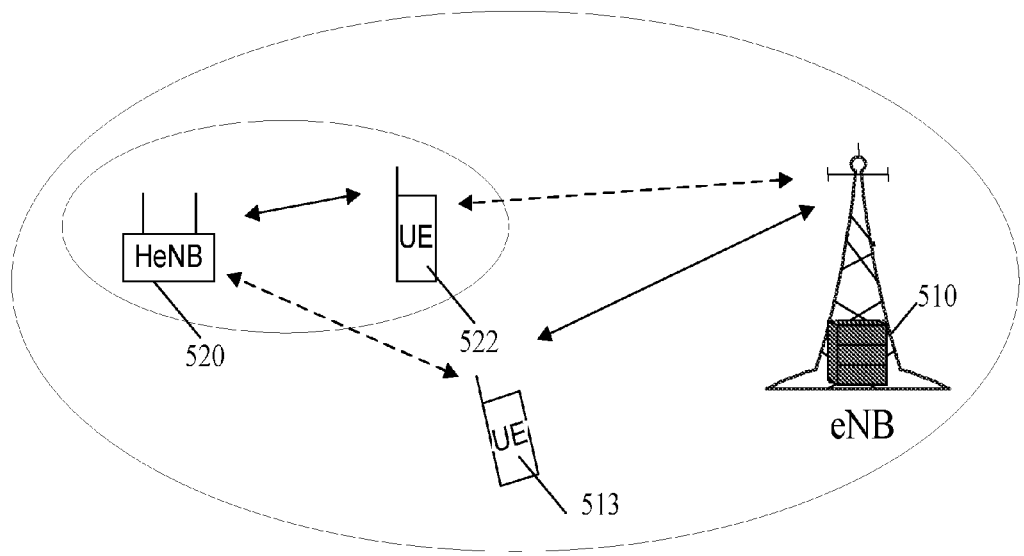
FIG. 5A illustrates an interference scenario in a wireless telecommunications network where the exemplary embodiments of the present invention are not applied.

Referring to FIG. 5A there is illustrated an exemplary telecommunications network where the interference is not mitigated using the solution provided by the exemplary embodiments of the present invention. The dashed arrows indicate the interference generated to eNB 510 and HeNB 520 respectively. Since here it is considered the case where HeNB 520 allocates resources to its UEs (e.g. UE 522) without taking into consideration the scheduling scheme of eNB 510, UE 522 may generate interference to eNB 510, indicated with dashed arrow from UE 522 to eNB 510. Similarly, UE 513 may generate interference to HeNB 520 if eNB 510 does not take into consideration the scheduling scheme of HeNB 520 when making its own scheduling strategy. It is here assumed that UE 513 and UE 522 have been scheduled resources within the same spectrum as eNB 510 and HeNB 520 did not have prior knowledge of the scheduling strategies of each other.

Figure 5B:
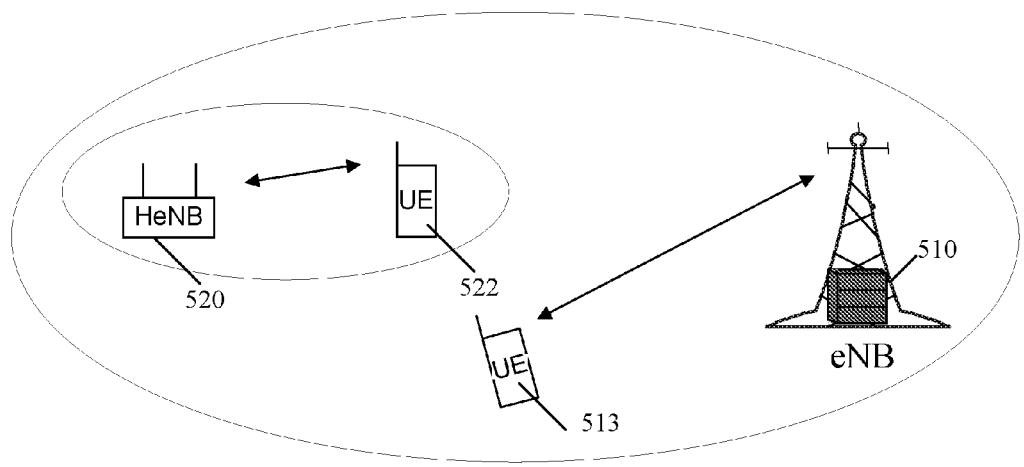
FIG. 5B illustrates the same network as the one in FIG. 5A but here the exemplary embodiments of the present invention are applied.

Referring to FIG. 5B, there is illustrated the same exemplary network of FIG. 5A. However, in this scenario, both eNB 510 and HeNB 520 are configured to take into consideration the scheduling strategy of each other for determining an own scheduling strategy in accordance with the previously described exemplary embodiments of the present inventions. As a result, a very limited or no interference at all is generated from UE 522 towards eNB 510 and a very limited or no interference at all is generated from UE 513 towards HeNB 520. Actually, some interference generated from UE 522 towards eNB 510 and from UE 513 towards HeNB 520 is present due to the physical properties of radio wave propagations, but this interference is reduced by taking into consideration the scheduling strategies of the eNB and HeNBs as previously described. In the scenario of FIG. 5B, UE 513 has been scheduled resources which are disjoint the resources that UE 522 uses for it transmission. It should be mentioned that the decreased interference provided by the exemplary embodiments of the present invention may come with the cost of a marginally increased delay. This is because the schedulers of the eNB and of the HeNB first have to take into account the scheduling strategy of each other before actually allocating resources to their UEs. However, the uplink and downlink performance achieved in the network overcomes the slight increase in the delay in terms of efficiency in the network.

Figure 6:
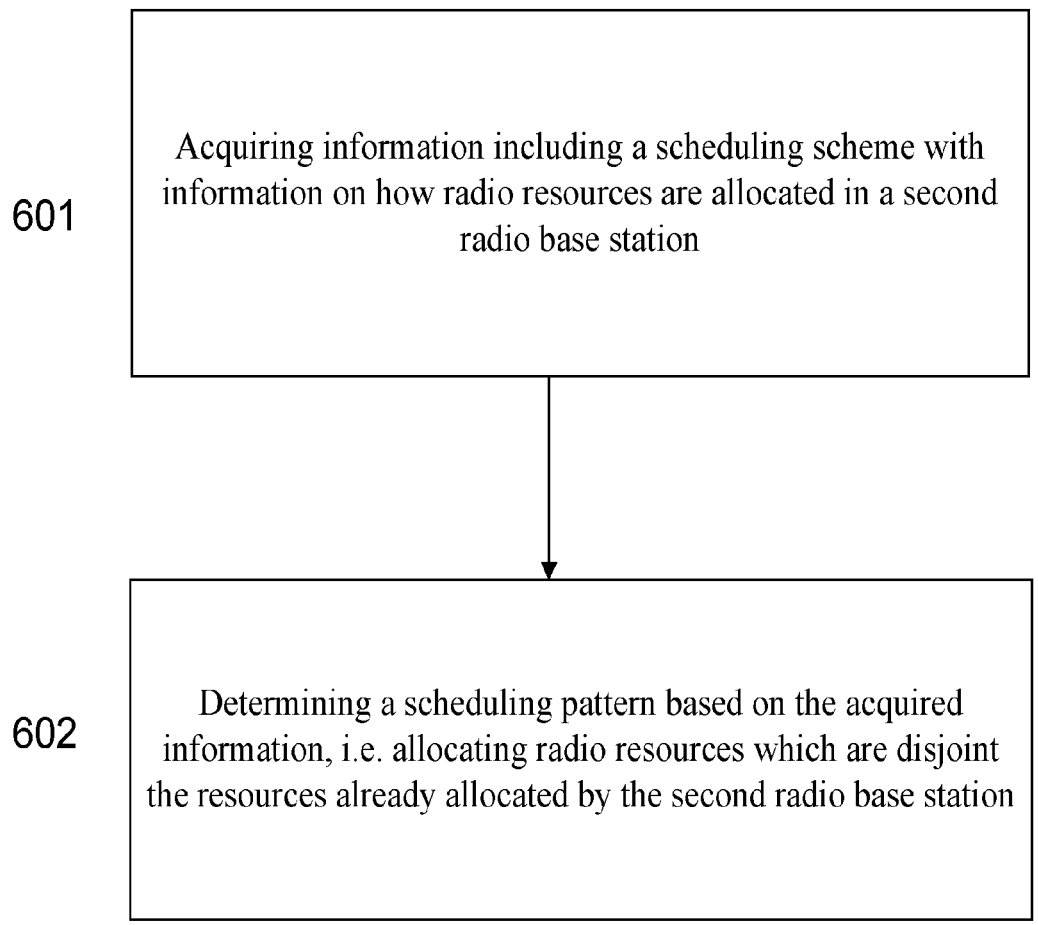
FIG. 6 is a diagram illustrating a flowchart of a method for use in a radio base station, according to exemplary embodiments of the present invention.

Referring to FIG. 6 there is illustrated a flowchart of a method for use in a first radio base station (eNB and/or HeNB), for facilitating reduction of interference according to the previously described exemplary embodiments of the present invention. As shown in FIG. 6, the main steps of the method comprise:

(601) acquiring information including a scheduling scheme indicating information on how radio resources are allocated in a second radio base station (HeNB or eNB depending on if the first radio base station in a eNB or a HeNB);

(602) determining a scheduling pattern based on the acquired information, said determining comprises allocating radio resources which are disjoint the resources already allocated by the second radio base station such that to facilitate reduction of interference between the first and the second radio base stations.

Additional exemplary embodiments regarding how the information in the scheduling pattern is acquired i.e. in a handover signalling and/or broadcasted in system information block, have already been described are therefore not repeated again.

Referring to FIG. 7 there is illustrated the main steps of the method (or procedure), a second radio base station (e.g. HeNB and/or eNB), for facilitating reduction of interference according to the previously described exemplary embodiments of the present invention. As shown in FIG. 7, the main steps of the method comprise:

(701) determining in the second radio base station a scheduling scheme including information on how radio resources are allocated;

(702) transmitting said information included in the scheduling scheme to a first radio base station (eNB or HeNB depending on if the second radio base station is a HeNB or a eNB) such that to allow the first radio base station to determine, based on the transmitted information, a scheduling pattern on how to allocate resources which are disjoint the resources already indicated as allocated by the second radio base station.

Figure 8:
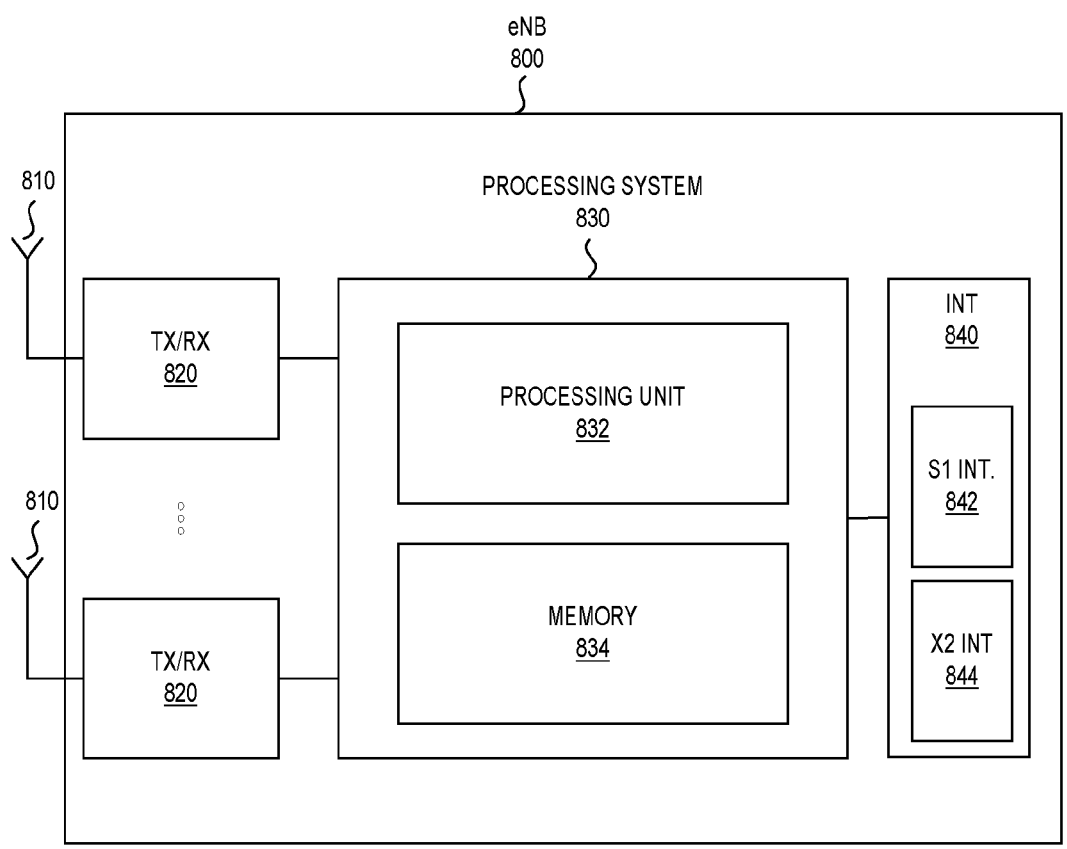
FIG. 8 illustrates a block diagram of an exemplary macro radio base station according to exemplary embodiments of the present invention.

Referring to FIG. 8 there is illustrated a block diagram of an exemplary macro radio base station 800 i.e. a eNB according to exemplary embodiments of the present invention. Exemplary components of eNB 800 are shown. As illustrated, eNB 800 may include antennas 810, transceivers 820, a processing system 830, and an interface 840. Antennas 810 may include one or more directional and/or omni-directional antennas. Transceivers 820 (transmitted/receiver (TX/RX)) may be associated with antennas 810 and include transceiver circuitry for transmitting and/or receiving symbol sequences in a network via antennas 810. Processing system 830 may control the operation of eNB 800. Processing system 830 may also process information received via transceivers 820 and interface 840. As illustrated, processing system 830 may include processing logic/unit 832 and a memory 834. It will be appreciated that processing system 830 may include additional and/or different components than illustrated in the figure. Processing logic/unit 832 may include a processor, microprocessor, an ASIC, FPGA, or the like. Processing logic/unit 832 may process information received via transceivers 820 and interface 840. Transceiver 820 is configured to acquire information including a scheduling scheme indicating information on how radio resources are allocated in another radio base station (i.e. a HeNB) and the processing logic/unit 832 which may also act or include a scheduler is configured, in accordance with exemplary embodiments of the present invention, to determine a scheduling pattern based on the acquired information, said scheduler 832 is configured to allocate (to UEs) radio resources which are disjoint the radio resources already by HeNB such that to facilitate reduction of interference between eNB 800 and HeNB. The eNB 800 is also configured to determine a scheduling scheme by means of the scheduler 832 and the eNB 800 is further configured to transmit the scheduling scheme, by means of the transceiver (TX/RX) 820 to a HeNB for allowing the HeNB to make a own scheduling strategy as previously described. The eNB 800 may further comprise a measurement unit configured to perform interference measurements.

Additional functions and operations of the eNB, in accordance with the exemplary embodiments of the present invention, have already been described and are therefore not repeated.

It should however be noted that the processing may further include, for example, data conversion, Forward Error Correction (FEC), rate adaptation, Quadrature Phase Shift Keying (QPSK) modulation etc. In addition, processing logic/unit 832 may generate additional messages e.g. control messages and/or data messages and cause those control messages and/or data messages to be transmitted via transceivers 820 and/or interface 840. Processing logic 832 may also process control messages and/or data messages received from transceivers 820 and/or interface 840. Memory 834 may include a RAM, a ROM, and/or another type of memory to store data and instructions that may be used by processing logic/unit 832.

Interface 840 may include one or more line cards that allow eNB 800 to transmit data to and receive data from other devices or nodes over wired and/or wireless connections. As illustrated, interface 840 includes an S1 interface 842 and my further include an X2 interface 844 that allows eNB 800 to communicate with another eNB. eNB 800 may perform certain operations in response to processing logic/unit 832 executing software instructions contained in a computer-readable medium, such as memory 834. A computer-readable medium may be defined as one or more physical and/or logical memory devices. The software instructions may be read into memory 834 from another computer-readable medium or from another device via interface 840. The software instructions contained in memory 834 may cause processing logic/unit 832 to perform processes described herein. Alternatively, hardwired circuitry may be used in place of or in combination with software instructions to implement processes/function/method described herein. Thus, embodiments described herein are not limited to any specific combination of hardware circuitry and software.

Figure 9:
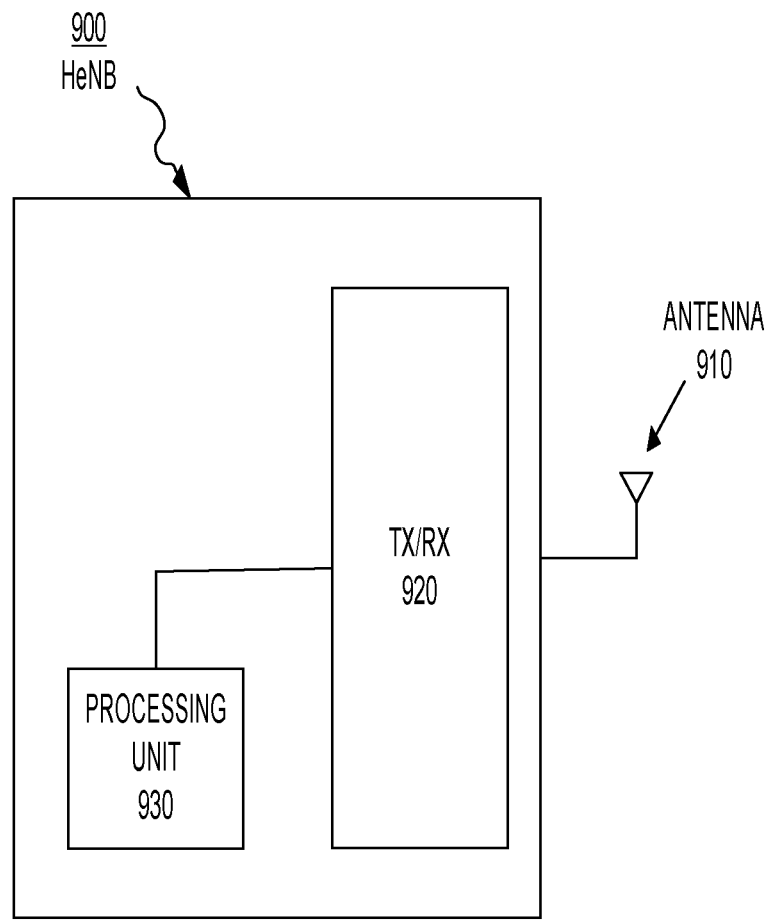
FIG. 9 illustrates a block diagram of an exemplary femto radio base station according to exemplary embodiments of the present invention.

As previously described, the exemplary embodiments of the present invention also relate to a femto radio base station. FIG. 9 is a simplified functional block diagram illustrating a femto radio base station 900 according to some exemplary embodiments. As shown, a femto redio base station (e.g. HeNB) 900 comprises one transceiver circuit (TX/RX) 920 in combination with an antenna 910, configured to transmit and receive data and control information. TX/RX 920 (in combination with antenna 910) is configured to acquire information regarding the scheduling scheme of a eNB. HeNB 900 further comprises a processing unit 930 acting as a scheduler (or including a scheduler) that is configured to determine based on the acquired information, a own scheduling pattern as previously described. The scheduler 930 is further configured to determine an own scheduling pattern and the transceiver 920 in combination with antenna 910 is configured to transmit the scheduling pattern to a eNB to allow the eNB to make a own scheduling strategy as previously described. The HeNB 900 may further comprise a measurement unit (not shown) configured to perform interference measurements. Note that HeNB 900 comprises interfaces (e.g. S1 interface) and other circuitry and components not shown in FIG. 9. Furthermore, HeNB 900 may comprise additional antennas and transceivers.

While the invention has been described in terms of several preferred embodiments, it is contemplated that alternatives, modifications, permutations and equivalents thereof will become apparent to those skilled in the art upon reading of the specifications and upon study of the drawings. It is therefore intended that the following appended claims include such alternatives, modifications, permutations and equivalents as fall within the scope of the present invention.

The invention claimed is:

1. A method for facilitating reduction of interference between a first radio base station and a second radio base station, the method comprising:
   acquiring, at the first radio base station, information including a scheduling scheme indicating in which order the second radio base station allocates radio resources in a frequency domain and/or in a time domain, said order depending on the load of the second radio base station;
   determining, in the first radio base station, a scheduling pattern based on the acquired information; the determining comprising allocating radio resources in a frequency domain and/or in a time domain which are disjoint with the radio resources already allocated by the second radio base station in an order opposite to the order used by the second radio base station, so as to reduce interference between the first and the second radio base stations.

2. The method according to claim 1 wherein the acquiring comprises acquiring the information during a handover signaling conveyed over a predefined interface between the first and the second radio base stations.

3. The method according to claim 1 wherein the acquiring comprises acquiring the information from at least one received system information block broadcasted by the second radio base station.

4. The method according to claim 1 wherein the acquiring comprises acquiring the information from interference measurements performed by the first radio base station.

5. A method for facilitating reduction of interference between a first radio base station and a second radio base station, the method comprising:
   determining, in the second radio base station, information including a scheduling scheme indicating in which order the second radio base station allocates radio resources in a frequency domain and/or in a time domain, said order depending on the load of the second radio base station;
   transmitting the information including the scheduling scheme to the first radio base station to allow the first radio base station to determine, based on the transmitted information, a scheduling pattern to allocate radio resources in a frequency domain and/or in a time domain which are disjoint to the radio resources already allocated by the second radio base station in an order opposite to the order used by the second radio base station, so as to reduce interference between the first and the second radio base stations.

6. The method according to claim 5 wherein the transmitting comprises transmitting the information during a handover signaling conveyed over a predefined interface between the second and the first radio base stations.

7. The method according to claim 5 wherein the transmitting comprises broadcasting the information in at least one system information block.

8. The method according to claim 5 wherein the determining comprises determining the scheduling scheme based on interference measurements.

9. A radio base station for facilitating reduction interference between the radio base station and another radio base station, comprising:
   a receiver configured to acquire information including a scheduling scheme indicating in which order the another radio base station allocates radio resources in a frequency domain and/or in a time domain, said order depending on the load of the another radio base station;
   a scheduler configured to determine a scheduling pattern based on the acquired information; wherein the scheduler is configured to allocate radio resources in a frequency domain and/or in a time domain which are disjoint to the radio resources already allocated by the another radio base station in an order opposite to the order used by the another radio base station, so as to reduce interference between the radio base station and the another radio base station.

10. The radio base station according to claim 9 further comprising a transmitter configured to transmit information including the determined scheduling pattern to another radio base station.

11. The radio base station according to claim 10 wherein the transmitter is configured to transmit the information including the determined scheduling pattern during a handover signaling conveyed over a predefined interface between the radio base station and the another radio base station.

12. The radio base station according to claim 10 wherein the transmitter is configured to transmit the information including the determined scheduling pattern in at least one broadcasted system information block.

13. The radio base station according to claim 10 wherein the scheduling pattern is determined based on interference measurements performed by the radio base station.

14. The radio base station according to claim 9 wherein the receiver is configured to acquire the scheduling scheme during handover signaling conveyed over a predefined interface between the radio base station and the another radio base station.

15. The radio base station according to claim 9 wherein the receiver is configured to acquire the scheduling scheme from at least one system information block broadcast by the another radio base station.

16. The radio base station according to claim 9 further comprising a measurement unit configured to perform interference measurements.

17. The radio base station according to claim 16 wherein the receiver is configured to acquire the scheduling scheme based on the interference measurements.

18. The radio base station according to claim 9 wherein the radio base station is a femto radio base station.

19. The radio base station according to claim 9 wherein the radio base station is macro radio base station.

* * * * *

UNITED STATES PATENT AND TRADEMARK OFFICE
CERTIFICATE OF CORRECTION

PATENT NO. : 9,119,213 B2
APPLICATION NO. : 13/389551
DATED : August 25, 2015
INVENTOR(S) : Stjemholm et al.

Page 1 of 1

It is certified that error appears in the above-identified patent and that said Letters Patent is hereby corrected as shown below:

On the Title Page, in Item (74), under "Attorney, Agent, or Firm", in Column 2, Line 1, delete "P.L.C.C." and insert -- PLLC --, therefor.

Specification

In Column 2, Line 55, delete "a Inter-Cell Interference" and insert -- an Inter-Cell Interference --, therefor.

In Column 5, Line 28, delete "UE 231" and insert -- UE 232 --, therefor.

In Column 7, Line 60, delete "to he" and insert -- to the --, therefor.

In Column 10, Line 43, delete "redio" and insert -- radio --, therefor.

Signed and Sealed this
Sixteenth Day of August, 2016

Michelle K. Lee
*Director of the United States Patent and Trademark Office*